US011271996B1

(12) United States Patent
Cini Sarreo et al.

(10) Patent No.: US 11,271,996 B1
(45) Date of Patent: Mar. 8, 2022

(54) CLIENT-SIDE LOAD BALANCING FOR REMOTE APPLICATION SERVERS

(71) Applicant: Parallels International GmbH, Schaffhausen (CH)

(72) Inventors: Matthew Cini Sarreo, Sliema (MT); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/844,582

(22) Filed: Apr. 9, 2020

(51) Int. Cl.
| | |
|---|---|
| *H04L 29/08* | (2006.01) |
| *H04L 29/06* | (2006.01) |
| *G06F 11/30* | (2006.01) |
| *G06F 11/34* | (2006.01) |
| *G06F 11/14* | (2006.01) |
| *H04L 67/1008* | (2022.01) |
| *H04L 67/01* | (2022.01) |
| *H04L 67/08* | (2022.01) |
| *H04L 67/75* | (2022.01) |

(52) U.S. Cl.
CPC ...... *H04L 67/1008* (2013.01); *G06F 11/1464* (2013.01); *G06F 11/3006* (2013.01); *G06F 11/3409* (2013.01); *H04L 67/08* (2013.01); *H04L 67/36* (2013.01); *H04L 67/42* (2013.01); *G06F 2201/84* (2013.01)

(58) Field of Classification Search
CPC ......... H04L 67/08; H04L 67/36; H04L 67/42; H04L 67/1008; G06F 11/1464; G06F 11/3006; G06F 11/3409; G06F 2201/84
See application file for complete search history.

(56) References Cited

U.S. PATENT DOCUMENTS

| | | | | |
|---|---|---|---|---|
| 6,078,960 | A * | 6/2000 | Ballard | H04L 67/1008 709/203 |
| 7,752,626 | B1 * | 7/2010 | Pandey | G06F 9/505 718/105 |
| 2010/0268764 | A1 * | 10/2010 | Wee | H04L 67/1002 709/203 |
| 2020/0142788 | A1 * | 5/2020 | Hu | G06F 11/2028 |

OTHER PUBLICATIONS

Parallels, "Parallels Remote Application Servier, Administrator's Guide 17.1", https://download.parallels.com/ras/v17/docs/en_US/Parallels-RAS-V17-Administrators-Guide.pdf, 417 pages.

(Continued)

*Primary Examiner* — Azizul Choudhury
(74) *Attorney, Agent, or Firm* — Rosenberg, Klein & Lee

(57) ABSTRACT

Systems and methods for implementing client-side load balancing for remote application servers. An example method comprises: receiving, by a publishing server, an application server status information reflecting computing resource utilization by each application server of a plurality of application servers; receiving a request initiated by a client computing device to access a published application executable by at least a subset of the plurality of application servers; and responsive to determining that a load metric reflecting performance of the publishing server exceeds a threshold value, transmitting an instruction to the client computing device to perform client-side load balancing using a snapshot of the application server status information to select an application server of the subset of the plurality of application servers.

14 Claims, 5 Drawing Sheets

(56) References Cited

OTHER PUBLICATIONS

Parallels, "Parallels Remote Application Server, Solutions Guide 17.1", https://download.parallels.com/ras/v17/docs/en_US/Parallels-RAS-v17-Solutions-Guide.pdf, 66 pages.

* cited by examiner

CLIENT-SIDE LOAD BALANCING FOR REMOTE APPLICATION SERVERS

TECHNICAL FIELD

The present disclosure is generally related to virtualized computer systems, and is specifically related to systems and methods for implementing client-side load balancing for remote application servers.

BACKGROUND

Remote Desktop Services (RDS) and various other remote access solutions allow a user to connect over a network to a remote computer or virtual machine, thus making the entire desktop or one or more applications running on the remote computer or virtual machine accessible via a client application running on a client device. The client application is responsible for forwarding graphical user interface (GUI) events to the remote computer or virtual machine, as well as for rendering on the client screen the graphics received from the remote computer or virtual machine.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
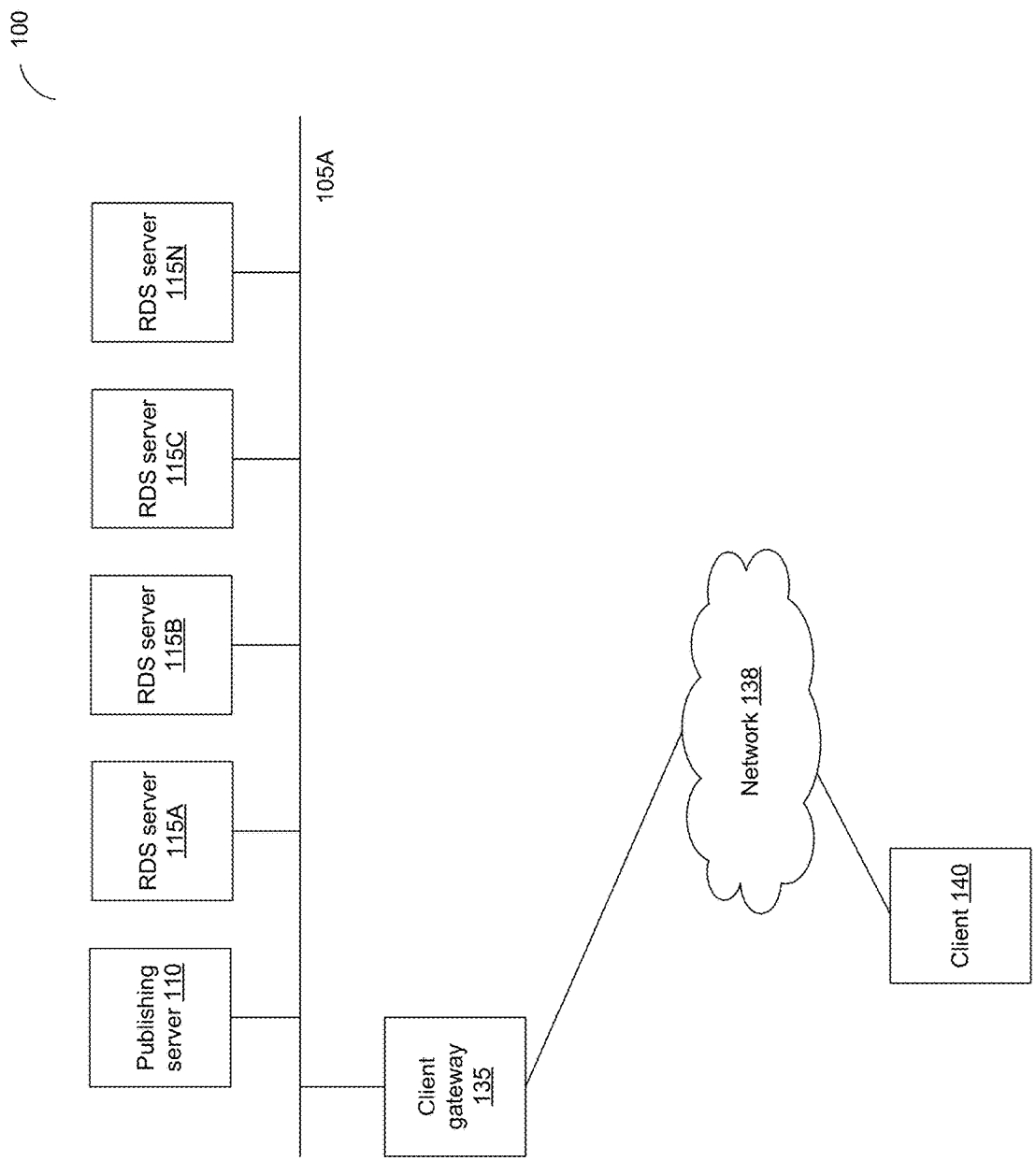
FIG. 1 schematically illustrates an example component diagram of a remote access infrastructure in which the methods and systems described herein may be implemented.

Described herein are systems and methods for implementing client-side load balancing for remote access servers.

A remote access infrastructure may include one or more remote desktop service (RDS) servers, such as a Remote Desktop Session Host (RDSH) servers, running one or more applications, which may be accessed by one or more clients. The client connections may be managed by a publishing server, such as the publishing agent of a Parallels® Remote Access Server (RAS), which may perform client authentication, load balancing, connection failover, and/or other relevant functions with respect to the client connections.

In some implementations, the remote access infrastructure may further include a client gateway (such as Parallels® Remote Access Server (RAS) gateway), which may be utilized for tunneling the application traffic through a single port and/or encrypting all traffic forwarded to client (e.g., by establishing a Secure Socket Layer (SSL) tunnel).

Thus, a user may employ a remote access client or a browser-based client to request, via the client gateway, access to a published application running on an RDS server. The client gateway may forward the client request to the publishing server, which would determine whether an existing session has been previously established between the requesting client and an RDS server running the requested application. Should such a session be identified, the session identifying information is returned, via the client gateway, to the requesting client. Otherwise, if the requesting client does not have an existing session to an RDS server running the requested application, the publishing server may identify one or more RDS servers running the requested application and then perform a load balancing procedure to select an RDS server for creating a new client session. The session identifying information for the newly created session is then returned, via the client gateway, to the requesting client.

While working fine for relatively small numbers of login requests arriving to the client gateway within a period of time, the above-described load balancing technique is inherently based on processing the incoming requests in a serialized manner, and thus may become a bottleneck if the number of client requests hitting the client gateway within a short period of time exceeds a certain threshold (this phenomenon is known as "login storm").

The systems and methods of the present disclosure alleviate the above-noted and other deficiencies by offloading the load balancing functionality to the requesting client, thus reducing the demand for the computing resources of the client gateway, allowing the latter to efficiently broker the client connections.

In an illustrative example, the clients periodically receive, from the publishing server, state snapshots reflecting information about published applications and the computing resource availability on the RDS servers. Snapshot versioning and validation may be implemented for discarding stale and/or inaccurate snapshots. A publishing server which experiences a high load may then offload the load balancing functionality to the requesting client, which would utilize the information provided by the state snapshot in order to select an RDS server for creating a new client session, unless the requesting client already has an existing session established with an RDS server running the requested application, as described in more detail herein below.

The systems and methods described herein may be implemented by hardware (e.g., general purpose and/or specialized processing devices, and/or other devices and associated circuitry), software (e.g., instructions executable by a processing device), or a combination thereof. Various aspects of the above referenced methods and systems are described in details herein below by way of examples, rather than by way of limitation.

FIG. 1 schematically illustrates an example component diagram of a remote access infrastructure in which the methods and systems described herein may be implemented. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity. Various other computer systems, software or hardware components, and/or methods of their interconnection which are not shown in FIG. 1 may be compatible with the methods and systems described herein.

As schematically illustrated by FIG. 1, the distributed computer system 100 may comprise one or more publishing servers 110 which may communicate, over one or more networks 105, with RDS servers 115A-115N. While in the illustrative example of FIG. 1 the RDS servers 115A-115N are shown as connected to a single network segment 105, in various other implementations, the RDS servers 115A-115N may be connected to two or more network segments, which may be interconnected by routers, firewalls, switches, and/or other suitable devices which are omitted from FIG. 1 for clarity and conciseness. Furthermore, while the illustrative example of FIG. 1 shows RDS servers, various other application servers, including virtual execution environments, such as virtual desktop interface (VDI) agents running on host computer systems executing virtual machines, may be employed for hosting the published applications.

One or more client gateways 135 may be employed for facilitating communications, over network 138, of one or more client devices 140 with the publishing server 110 and/or RDS servers 115A-115N. The client gateway 135 may act as a proxy between the client 140 and the publishing server 110 and/or between the client 140 and the selected RDS server. In some implementations, the client gateway 135 may tunnel all application traffic through a single port. In some implementations, the client gateway 135 may encrypt all traffic forwarded to client 140 (e.g., by establishing a Secure Socket Layer (SSL) tunnel between itself and the client 140). In some implementations, the client gateway 135 may further enforce certain licensing rules with respect to the publishing applications, e.g., by limiting a published application instance to a single session in order to disable application session sharing, allowing users to start only a single instance of a published application, and/or limiting the number of concurrently running instances of a published application.

The publishing server 110 may facilitate the clients' access to the published applications based on individual user's or user group's access rights to the applications running in the RDS servers, which may be configured via the administrative console of the publishing server 110.

In an illustrative example, a user may employ a remote access client 140 or a browser-based client to request, via the client gateway 135, access to a published application running on an RDS server 115A-115N. The client gateway may forward the client request to the publishing server 110, which would determine whether an existing session has been previously established between the requesting client 140 and an RDS server 115 running the requested application. Should such a session be identified, the session identifying information is returned, via the client gateway 135, to the requesting client 140. Otherwise, if the requesting client 140 does not have an existing session to an RDS server 115 running the requested application, the publishing server 110 may identify one or more RDS servers running the requested application and then perform a load balancing procedure to select an RDS server 115 for creating a new client session. The session identifying information for the newly created session is then returned, via the client gateway 135, to the requesting client 140.

As noted herein above, the above-described load balancing technique is inherently based on processing the incoming requests in a serialized manner (e.g., the round robin scheme assigns each incoming request to the current server and advances the pointer to the current server by one position in a wrapped-around list of available servers), and thus may become a bottleneck if the number of client requests hitting the client gateway within a short period of time exceeds a certain threshold (this phenomenon is known as "login storm"). Accordingly, in some implementations, the load balancing functionality may be offloaded to the requesting client, thus reducing the demand for the computing resources of the publishing agent, allowing the latter to efficiently broker the client connections.

In an illustrative example, the clients periodically receive, from the publishing server, application server state snapshots reflecting information about published applications and the computing resources (e.g., the central processing unit (CPU) and memory usage and/or availability) of the RDS servers. Snapshot versioning and validation may be implemented for discarding stale and/or inaccurate snapshots. The publishing sever 110 may, if operating under high load, offload the load balancing functionality to the requesting client 140, which would utilize the information provided by the state snapshot in order to select an RDS server 115 for creating a new client session.

Figure 2:
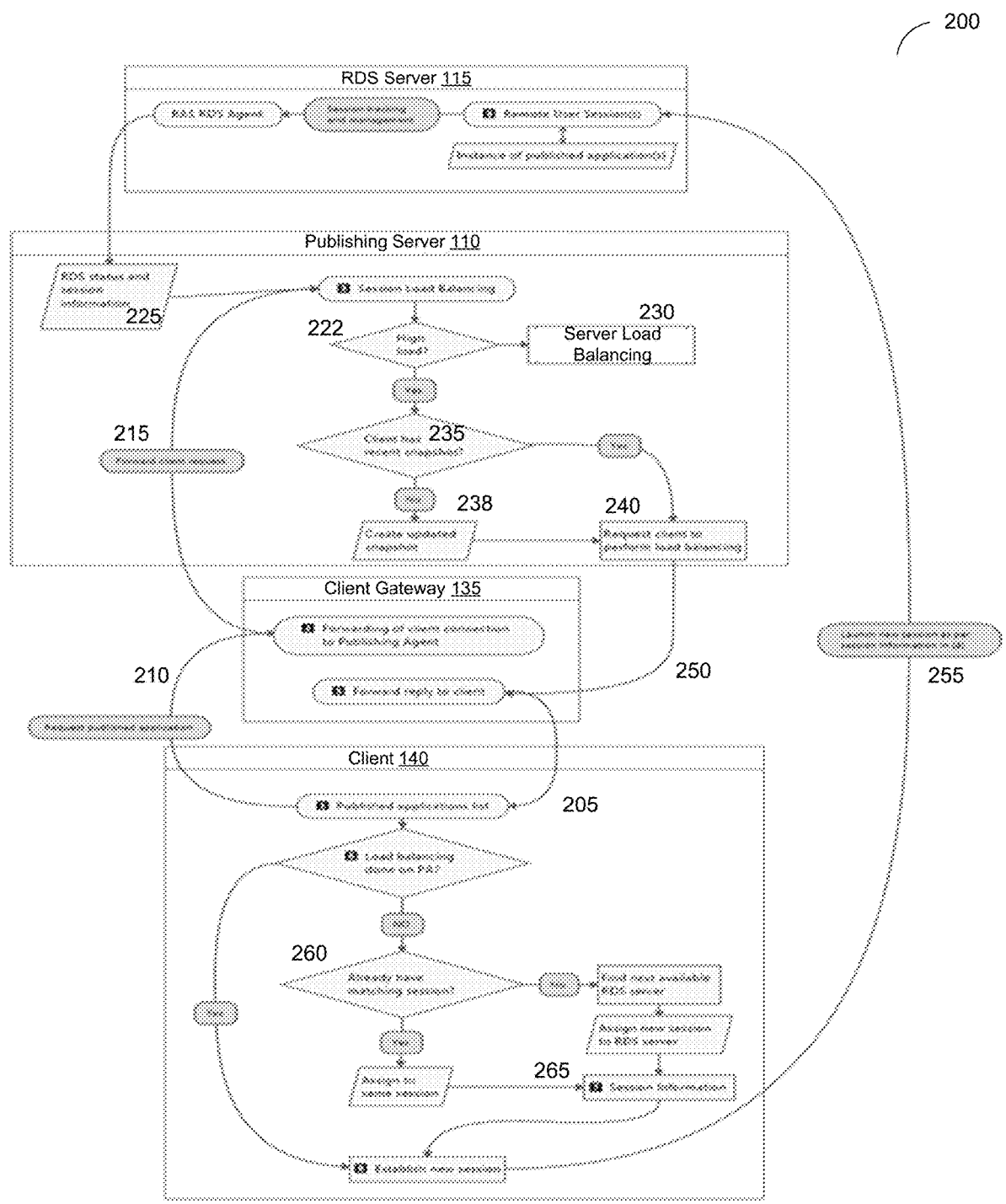
FIG. 2 illustrates an example load balancing workflow implemented in accordance with one or more aspects of the present disclosure.

FIG. 2 illustrates an example load balancing workflow 200 implemented in accordance with one or more aspects of the present disclosure. The workflow 200 may be initiated by the client 140 transmitting a request 210 for access to a published application (which may e.g., be selected by the user from the published application list 205). Responsive to receiving the request 210, the client gateway 140 may forward (operation 215) the request to the publishing server 110.

Upon receiving the client request (operation 215), the publishing server 110 may, depending on the load level ascertained at operation 222, either perform the server-side load balancing (operation 230) or, upon determining (operation 235) that the client 140 has a valid RDS status information snapshot or supplying (operation 238) a valid RDS status information snapshot to the client 140, instruct (operation 240) the client 140 to perform the load balancing.

The RDS status information 225, which is periodically received from each RDS server 115, may include the following information for the originating RDS server: a list of published applications, a list of existing client sessions, and computing resource (such as CPU, memory, network) usage and/or availability. An RDS status information snapshot may reflect the RDS status information 225 as of a certain time, which may be stored as the snapshot timestamp and/or reflected by the snapshot version, which may be represented by an integer value which is incremented with every update.

The server-side load balancing (operation 230) performed by the publishing server 110 may involve determining, based on the RDS status information 225, whether an existing session has already been established between the requesting client 140 and an RDS server 115 running the requested application. Should such a session be identified, the session identifying information is returned, via the client gateway 135, to the requesting client 140. Otherwise, if the requesting client 140 does not have an existing session with an RDS server 115 running the requested application, the publishing server 110 identifies, based on the RDS status information 225, one or more RDS servers 115 running the requested application and then performs a load balancing procedure to select an RDS server for creating a new client session. The load balancing may be performed by implementing a round robin scheme, selecting the least loaded server based on the available CPU and/or memory reported by the server, or implementing other suitable load balancing scheme(s). The session identifying information 250 for the newly created session is then returned, via the client gateway 135, to the requesting client 140, which may utilize the session identifying information 250 for connecting (operation 255) to the RDS server specified by the session identifying information 250.

The client-side load balancing (initiated by the operation 240 performed by the publishing server 110) may involve determining (operation 260), by the client 140, based on the per-server lists of published applications included into the snapshot of the RDS status information 225, whether an existing session has already been established with an RDS server 115 running the requested application. Should such a session be identified, the session identifying information 265 is utilized for connecting (operation 255) to the RDS server specified by the session identifying information 265. Otherwise, if there is no pre-existing session with an RDS server 115 running the requested application, the client 140 identifies, based on the snapshot of the RDS status information 225, one or more RDS servers 115 running the requested application and then performs a load balancing procedure to select an RDS server for creating a new client session. The client-side load balancing may be performed by implementing a round robin scheme, selecting the least loaded server based on the available CPU and/or memory reported by the server, or implementing other suitable load balancing scheme(s). The session identifying information 265 for the new session is utilized for connecting (operation 255) to the RDS server specified by the session identifying information 265.

Figure 3:
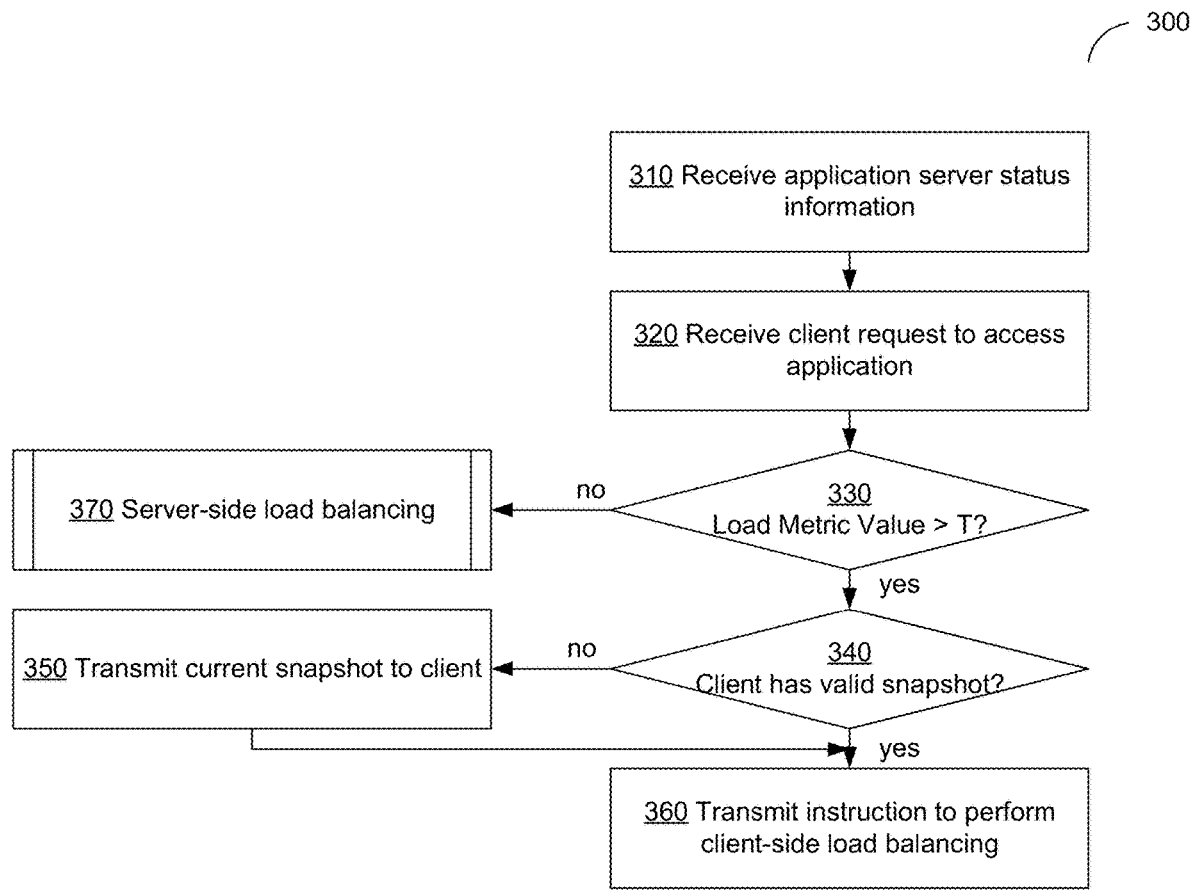
FIG. 3 depicts a flow diagram of an example method 300 for selectively initiating client-side load balancing in accordance with one or more aspects of the present disclosure.

Thus, a publishing server which experiences a high load may then offload the load balancing functionality to the client, which would utilize the information provided by the application server state snapshot in order to select an RDS server for creating a new client session, unless the requesting client already has an existing session established with an RDS server running the requested application FIG. 3 depicts a flow diagram of an example method 300 for selectively initiating client-side load balancing in accordance with one or more aspects of the present disclosure. Method 300 and/or each of its individual functions, routines, subroutines, or operations may be performed by one or more processors of the computer system (e.g., publishing server 110 of FIG. 1) implementing the method. In some implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, the publishing server implementing the method receives, from a plurality of application servers, application server status information reflecting computing resource utilization by a respective application server of the plurality of application servers. In various illustrative examples, the application servers may be represented by RDS servers, virtual execution environments, or other suitable servers. The application server status information may include the following information for the originating application server: a list of published applications, a list of existing client sessions, and computing resource (such as CPU, memory, network) usage and/or availability.

At block 320, the publishing server implementing the method receives a request initiated by a client computing device to access a published application executable by at least a subset of the plurality of application servers. The request may specify the application and one or more optional parameters to be supplied to the application. In some implementations, the request may further specify the user authentication credentials (such as the user name, password, access token, etc.).

Responsive to determining, at block 330, that the current value of a load metric of the publishing server exceeds a certain threshold metric value, the processing continues at block 340. Otherwise, the method branches to block 370. In various illustrative examples, the load metric may be represented by the CPU utilization, memory utilization, network utilization, the number of incoming client requests within a specified period of time, or a combination of these and/or other metrics reflecting the computing resource usage by the publishing server.

Responsive to determining, at block 340, that a valid application server information snapshot has been transmitted to the requesting client, the publishing server, at block 360, transmits to the requesting client an instruction to perform client-side load balancing. In some implementations, the instruction may specify the least recent valid version of the application server information snapshot, to be compared by the client with the version of the locally stored application server information snapshot.

Otherwise, responsive to determining, at block 340, that a valid application server information snapshot has not been transmitted to the requesting client, the publishing server, at block 350, transmits the most recent application server information snapshot to the requesting client, and the processing continues at block 360.

Responsive to determining, at block 330, that the current value of a load metric of the publishing server is less than or equal to the threshold metric value, the publishing server, at block 370, performs the server-side load balancing to select, among the plurality of application servers, an application server to service the incoming client request.

In an illustrative example, the server-side load balancing may involve determining, based on the application server status information, whether an existing session has already been established between the requesting client and an application server running the requested application. Should such a session be identified, the session identifying information is returned, via the client gateway, to the requesting client. Otherwise, if the requesting client does not have an existing session with an application server running the requested application, the publishing server identifies, based on the application status information, one or more application servers running the requested application and then performs a load balancing procedure to select an application server for creating a new client session. The load balancing may be performed by implementing a round robin scheme, selecting the least loaded server based on the available CPU and/or memory reported by the server, or implementing other suitable load balancing scheme(s). The session identifying information for the newly created session is then returned, via the client gateway, to the requesting client, which may utilize the session identifying information for connecting to the application server specified by the session identifying information.

Figure 4:
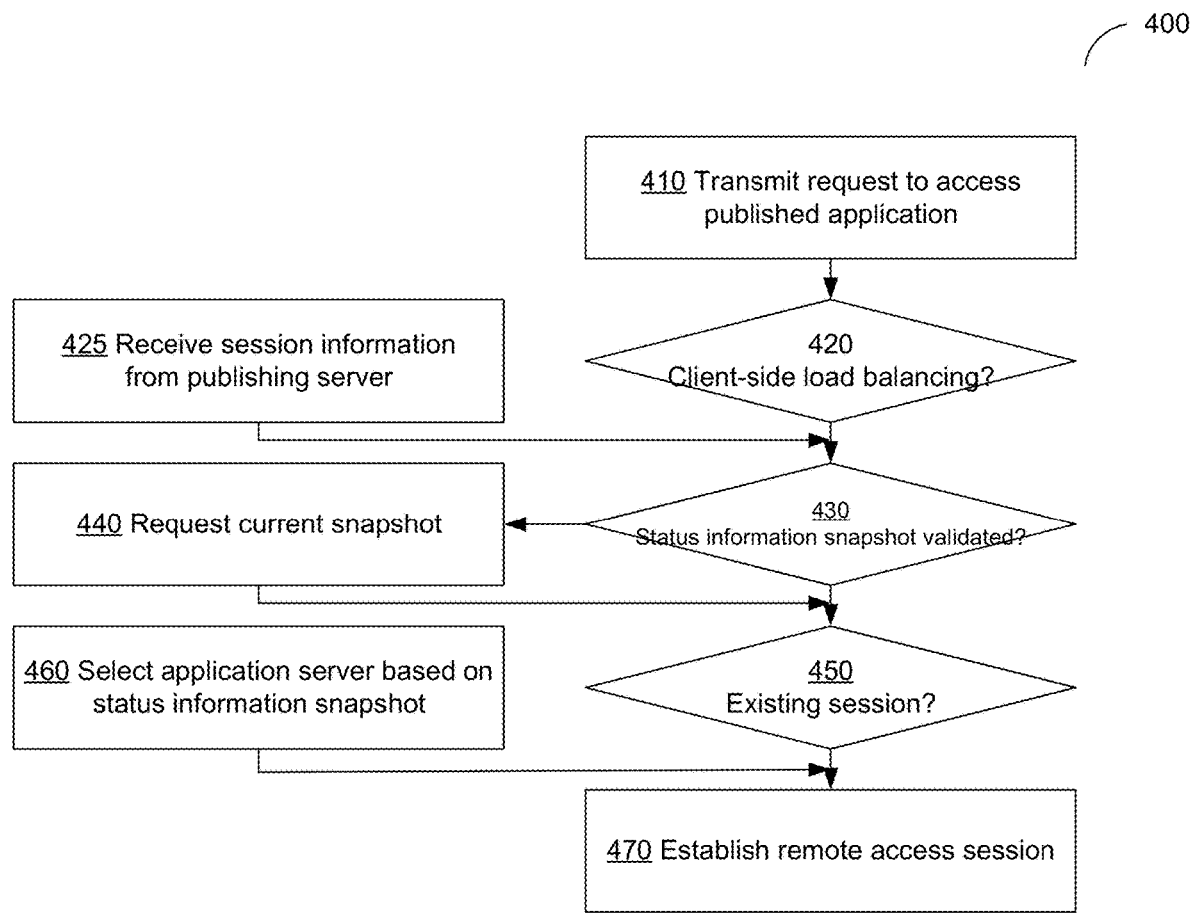
FIG. 4 depicts a flow diagram of an example method 400 for performing client-side load balancing by a client computing device operating in accordance with one or more aspects of the present disclosure.

FIG. 4 depicts a flow diagram of an example method 400 for performing client-side load balancing by a client computing device operating in accordance with one or more aspects of the present disclosure. Method 400 and/or each of its individual functions, routines, subroutines, or operations may be performed by one or more processors of the computer system (e.g., client computing device 140 of FIG. 1)

implementing the method. In some implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, the client computing device implementing the method transmits, to a publishing server a request to access a published application executable on or more application servers. In various illustrative examples, the "published application" as used herein may refer to a single application or to a virtual desktop of a virtual execution environment (such as a terminal services session or a virtual machine) hosting multiple applications.

Responsive to receiving, at block 420, an instruction from the publishing server to perform client-side load balancing, the processing continues at block 430; otherwise, the method branches to block 425, where the client computing device receives the session identifying information supplied by the publishing server, and the processing continues at block 470. In some implementations, the instruction may specify the least recent valid version of the application server information snapshot.

Responsive to successfully validating, at block 430, the locally stored snapshot of the application server status information, the processing continues at block 450; otherwise, at block 440, the client computing device requests the current snapshot of the application server status information from the publishing server. In an illustrative example, validation of the locally stored snapshot of the application server status information may involve comparing the version number of the locally stored snapshot of the application server status information with the version number specified by the instruction received at block 420 from the publishing server. Should the version number of the locally stored snapshot of the application server status information match the version number specified by the instruction received from the publishing server, the processing continues at block 450; otherwise, at block 440, the client computing device requests the current snapshot of the application server status information from the publishing server.

Responsive to determining, at block 450, based on the snapshot of the application status information, that an existing session has already been established with an application server running the requested application, the processing continues at block 470; otherwise, at block 460, the client computing device selects, among one or more application servers running the requested application, an application server for creating a new client session. The selection may involve implementing a round robin scheme, selecting the least loaded server based on the available CPU and/or memory reported by the server, or implementing other suitable load balancing scheme(s).

At block 470, the computing device establishes a remote access session with the selected application server, and the method terminates.

Figure 5:
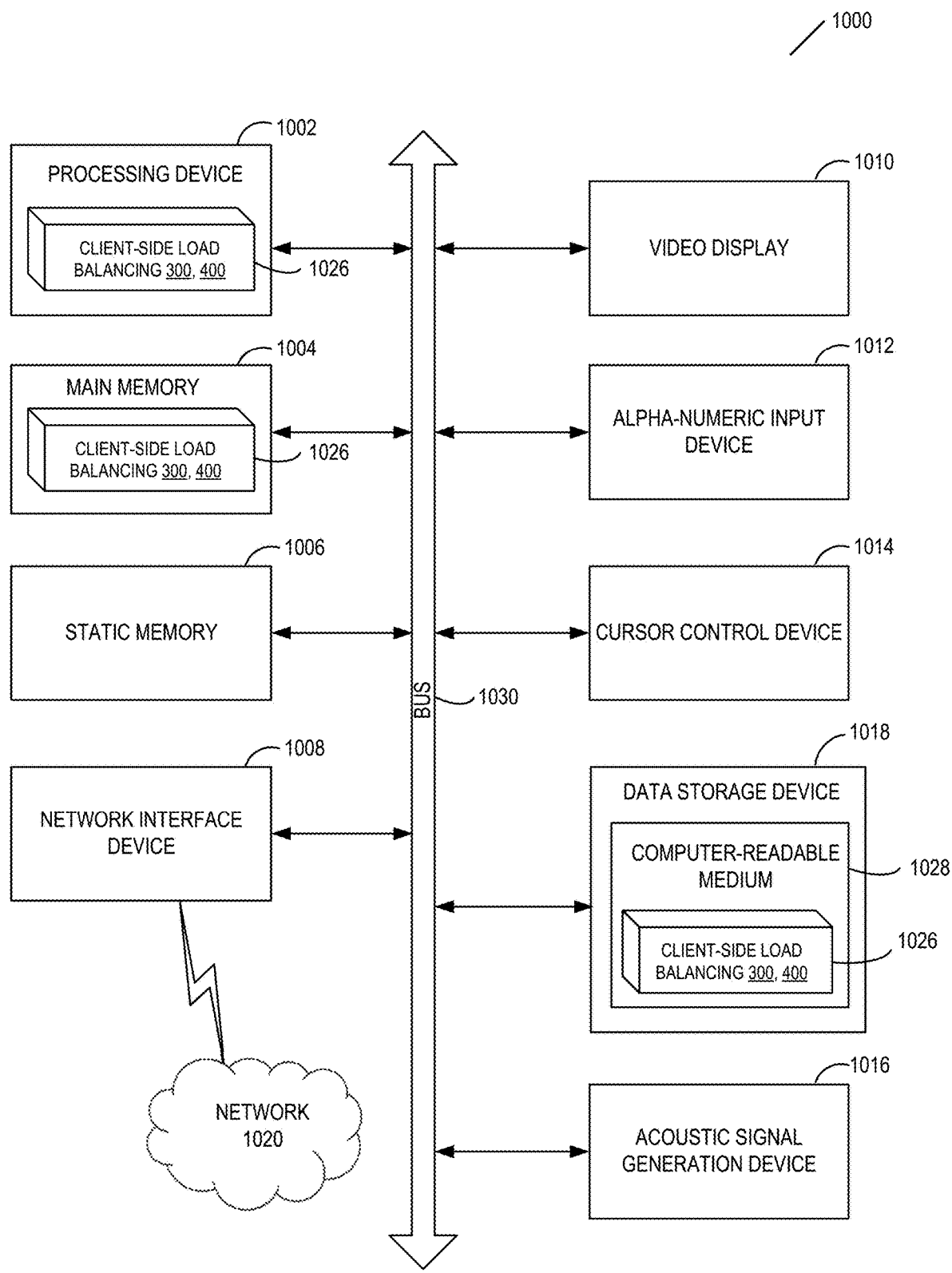
FIG. 5 depicts a block diagram of an example computer system operating in accordance with one or more aspects of the present disclosure.

FIG. 5 schematically illustrates a component diagram of an example computer system 1000 which may perform any one or more of the methods described herein. In various illustrative examples, computer system 1000 may represent the publishing server 110, client gateway 135, and/or client device 140 of FIG. 1.

Example computer system 1000 may be connected to other computer systems in a LAN, an intranet, an extranet, and/or the Internet. Computer system 1000 may operate in the capacity of a server in a client-server network environment. Computer system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute instructions implementing method 300 for selectively initiating client-side load balancing and/or method 400 for performing client-side load balancing in accordance with one or more aspects of the present disclosure.

Example computer system 1000 may further comprise a network interface device 1008, which may be communicatively coupled to a network 1020. Example computer system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of method 300 for selectively initiating client-side load balancing and/or method 400 for performing client-side load balancing in accordance with one or more aspects of the present disclosure.

Executable instructions 1026 may also reside, completely or at least partially, within main memory 1004 and/or within processing device 1002 during execution thereof by example computer system 1000, main memory 1004 and processing device 1002 also constituting computer-readable storage media. Executable instructions 1026 may further be transmitted or received over a network via network interface device 1008.

While computer-readable storage medium 1028 is shown as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required operations, functions, or methods. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:

receiving, by a publishing server, an application server status information reflecting computing resource utilization by each application server of a plurality of application servers;

receiving a request initiated by a client computing device to access a published application executable by at least a subset of the plurality of application servers; and responsive to determining that a load metric reflecting performance of the publishing server exceeds a threshold value, transmitting an instruction to the client computing device to perform client-side load balancing using a snapshot of the application server status information to select an application server of the subset of the plurality of application servers; wherein the snapshot of the application server status information comprises information relating to published applications and computing resource availability of each application server of the plurality of application servers;

the snapshot of the application server status information further comprises further information for each application server of the subset of the plurality of application servers relating to existing client sessions supported by the application server of the subset of the plurality of application servers; and the client-side load balancing using a snapshot of the application server status information to select an application server of the subset of the plurality of application servers comprises:

determining whether an existing session has already been established for the published application by the client computing device with an application server of the subset of the plurality of application servers;

upon a positive determination that the existing session has already been established for the published application by the client computing device with an application server of the subset of the plurality of application servers using the client session information within the snapshot of the application server status information to connect to the application server of the subset of the plurality of application servers having the existing session; and upon a negative determination that the existing session has already been established for the published application by the client computing device with an application server of the subset of the plurality of application servers the client computing device:

identifies based upon the client session information within the snapshot of the application server status information one or more further servers running the published application; and performs a load balancing procedure to select a further server of the one or more further servers to establish a new client session for the published application using the client session information within the snapshot of the application server status information.

2. The method according to claim 1, wherein
transmitting an instruction to the client computing device to perform client-side load balancing further comprises transmitting a valid snapshot of application server status information to the client-side device from the publishing server.

3. The method according to claim 1, further comprising
determining prior to transmitting the instruction to the client computing device to perform client-side load balancing whether the client computing device has a valid snapshot of application server status information;
upon a positive determination that the client computing device has a valid snapshot of application server status information transmitting the instruction to the client computing device; and
upon a negative determination that the client computing device has a valid snapshot of application server status information supplying a valid snapshot of application server status information to the client computing device in conjunction with transmitting the instruction.

4. The method according to claim 1, wherein
the snapshot of the application server status information comprises further information for each application server of the subset of the plurality of application servers relating to existing client sessions supported by the application server of the subset of the plurality of application servers.

5. The method according to claim 1, wherein
the load metric reflecting performance of the publishing server is selected from the group comprising CPU utilization, memory utilization, network utilization, the number of incoming client requests within a specified period of time.

6. The method according to claim 1, further comprising
transmitting with the instruction data specifying the last recent valid snapshot of the application server status information;
comparing, with the client computing device, the data specifying the last recent valid snapshot of the application server status information with the current locally stored snapshot of the application status server information; and
upon a determination that the data specifying the last recent valid snapshot of the application server status information does not match the current locally stored snapshot of the application status server information the client computing device requests the last recent valid snapshot of the application server status information from the publishing server.

7. A method, comprising:
transmitting, by a client computing device, a request to a publishing server to access a published application executable by at least a subset of a plurality of application servers;
receiving, from the publishing server, an instruction to perform client-side load balancing;
selecting, using a snapshot of an application server status information, an application server of the subset of the plurality of application servers; and
establishing a remote access session with the selected application server; wherein
the snapshot of the application server status information comprises information relating to published applications and computing resource availability of each application server of the plurality of application servers; and
the snapshot of the application server status information further comprises further information for each application server of the subset of the plurality of application servers relating to existing client sessions supported by the application server of the subset of the plurality of application servers; and
the client-side load balancing using a snapshot of the application server status information to select an application server of the subset of the plurality of application servers comprises:

determining whether an existing session has already been established for the published application by the client computing device with an application server of the subset of the plurality of application servers;

upon a positive determination that the existing session has already been established for the published application by the client computing device with an application server of the subset of the plurality of application servers using the client session information within the snapshot of the application server status information to connect to the application server of the subset of the plurality of application servers having the existing session; and upon a negative determination that the existing session has already been established for the published application by the client computing device with an application server of the subset of the plurality of application servers the client computing device:
identifies based upon the client session information within the snapshot of the application server status information one or more further servers running the published application; and
performs a load balancing procedure to select a further server of the one or more further servers to establish a new client session for the published application using the client session information within the snapshot of the application server status information.

8. The method of claim 7, further comprising:
responsive to failing to successfully validate the snapshot of the application server status information, requesting a new snapshot of the application server status information from the publishing server.

9. The method of claim 7, wherein
selecting the application server is performed responsive to failing to identify an existing session with a second application server of the subset of the plurality of application servers, wherein the second application server is running the published application.

10. The method according to claim 7, wherein receiving the instruction to the client computing device to perform client-side load balancing further comprises receiving upon the client computing device from the publishing server a valid snapshot of application server status information.

11. The method according to claim 7, wherein the publishing server prior to transmitting the instruction to perform client-side load balancing determines whether the client computing device has a valid snapshot of application server status information;

upon a positive determination that the client computing device has a valid snapshot of application server status information transmitting the instruction to the client computing device; and upon a negative determination that the client computing device has a valid snapshot of application server status information supplying a valid snapshot of application server status information to the client computing device in conjunction with transmitting the instruction.

12. The method according to claim 7, wherein the snapshot of the application server status information comprises further information for each application server of the subset of the plurality of application servers relating to existing client sessions supported by the application server of the subset of the plurality of application servers.

13. The method according to claim 7, wherein the load metric reflecting performance of the publishing server is selected from the group comprising CPU utilization, memory utilization, network utilization, the number of incoming client requests within a specified period of time.

14. The method according to claim 7, further comprising receiving with the instruction data specifying the last recent valid snapshot of the application server status information;

comparing, with the client computing device, the data specifying the last recent valid snapshot of the application server status information with the current locally stored snapshot of the application status server information; and upon a determination that the data specifying the last recent valid snapshot of the application server status information does not match the current locally stored snapshot of the application status server information transmitting to the publishing server a request for the last recent valid snapshot of the application server status information.

\* \* \* \* \*